(12) United States Patent
Kageyama

(10) Patent No.: US 10,618,570 B2
(45) Date of Patent: Apr. 14, 2020

(54) LOWER VEHICLE-BODY STRUCTURE OF AUTOMOTIVE VEHICLE

(71) Applicant: MAZDA MOTOR CORPORATION, Hiroshima (JP)

(72) Inventor: Kazuhiro Kageyama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 88 days.

(21) Appl. No.: 15/959,908

(22) Filed: Apr. 23, 2018

(65) Prior Publication Data

US 2019/0009832 A1 Jan. 10, 2019

(30) Foreign Application Priority Data

Jul. 6, 2017 (JP) .................. 2017-132631

(51) Int. Cl.
| | |
|---|---|
| *B62D 25/20* | (2006.01) |
| *B60N 2/015* | (2006.01) |
| *B62D 21/15* | (2006.01) |
| *B62D 21/03* | (2006.01) |

(52) U.S. Cl.
CPC ............ *B62D 25/20* (2013.01); *B60N 2/015* (2013.01); *B62D 21/157* (2013.01); *B62D 21/03* (2013.01)

(58) Field of Classification Search
CPC ...... B60N 2/015; B62D 21/03; B62D 21/157; B62D 25/20; B62D 25/2009; B62D 25/2036
USPC ............................................ 296/193.07, 204
See application file for complete search history.

(56) References Cited

U.S. PATENT DOCUMENTS

| | | | | | |
|---|---|---|---|---|---|
| 6,007,145 | A | * | 12/1999 | Tezuka ................... | B62D 25/20 296/203.01 |
| 8,567,857 | B2 | * | 10/2013 | Fujii ..................... | B60R 22/023 296/193.05 |
| 9,873,457 | B2 | * | 1/2018 | Onishi ................. | B62D 21/157 |
| 9,896,131 | B2 | * | 2/2018 | Onishi ................. | B62D 21/157 |

(Continued)

FOREIGN PATENT DOCUMENTS

| | | |
|---|---|---|
| JP | S56-073977 U | 3/1981 |
| JP | 2016-210335 A | 12/2016 |

OTHER PUBLICATIONS

An Office Action mailed by the Japanese Patent Office dated May 14, 2019, which corresponds to Japanese Patent Application No. 2017-132631 and is related to U.S. Appl. No. 15/959,908; with partial English translation.

*Primary Examiner* — Jason S Daniels
(74) *Attorney, Agent, or Firm* — Studebaker & Brackett PC

(57) ABSTRACT

In a lower vehicle-body structure of an automotive vehicle which comprises a third tunnel reinforcement provided at a lower-face side of a floor tunnel and a first seat-attaching bracket connecting the floor tunnel and a floor panel, the third tunnel reinforcement comprises a front-side contact portion, a middle contact portion, and a rear-side contact portion which respectively contact the floor tunnel, and a first protrusion portion and a second protrusion portion which respectively protrude in a direction leaving from a lower face of the floor tunnel, which are formed integrally. Further, a flange portion of the first seat-attaching bracket is connected to the front-side contact portion, the middle contact portion, and the rear-side contact portion of the third tunnel reinforcement through the floor tunnel.

4 Claims, 11 Drawing Sheets

(56) References Cited

U.S. PATENT DOCUMENTS

2010/0237659 A1* 9/2010 Ishigame ............. B62D 21/157
                                                  296/204
2016/0159402 A1* 6/2016 Nakaya .................. B62D 25/20
                                                  296/193.02

* cited by examiner

LOWER VEHICLE-BODY STRUCTURE OF AUTOMOTIVE VEHICLE

BACKGROUND OF THE INVENTION

The present invention relates to a lower vehicle-body structure of an automotive vehicle which comprises a seat-attaching bracket supporting a seat where a passenger is seated.

In a vehicle, such as an automotive vehicle, when another vehicle collides with a vehicle side of an own vehicle or the vehicle side of the own vehicle collides with an obstacle, a side-collision load which is applied from the vehicle side is transmitted and dispersed, by way of one of side sills, a cross member, and a floor panel, to the other side sill. Herein, it is known that the rigidity of a lower vehicle body against this side-collision load for the vehicle which comprises a floor tunnel protruding upward is lower than that for a vehicle which does not comprise the floor tunnel.

Accordingly, the vehicle comprising the floor tunnel is generally configured such that a tunnel reinforcement as a reinforcing member to improve the rigidity of the floor tunnel is provided at a lower-face side of the floor tunnel such that it matches a shape of the floor tunnel.

Japanese Patent Laid-Open Publication No. 2016-210335, for example, discloses a structure in which at a lower-face side of a floor tunnel 2 are provided a front-side tunnel brace 17 (tunnel reinforcement) which is joined to the floor tunnel 2 substantially at the same position, in a vehicle longitudinal direction, as a first cross member 4 located on a vehicle forward side and a rear-side tunnel brace 18 (tunnel reinforcement) which is joined to the floor tunnel 2 substantially at the same position, in the vehicle longitudinal direction, as a first cross member 15 located in back of the first cross member 4.

In the structure disclosed in the above-described patent document, the first cross member 4 and the front-side tunnel brace 17 are connected by a first front-side seat-attaching bracket 11 which supports a seat where a passenger is seated, and the second cross member 15 and the rear-side tunnel brace 18 are connected by a first rear-side seat-attaching bracket 13.

Thus, by connecting the cross member and the tunnel reinforcement as well as providing the tunnel reinforcement at the floor tunnel, the rigidity of a load transmission path where the side-collision load is transmitted can be more improved, so that the side-collision which is applied to one side, in the vehicle width direction, of the vehicle can be securely transmitted and dispersed to the other side of the vehicle.

Meanwhile, the higher collision safety against the collision where the obstacle collides with the vehicle side has been recently required in order to securely protect a passenger in a cabin. Therefore, there occurs new needs for further improving the mechanical strength of the floor tunnel and the rigidity of the seat-attaching bracket which are both located on the load transmission path where the side-collision load applied to the one side, in the vehicle width direction, of the vehicle is transmitted.

SUMMARY OF THE INVENTION

In view of the above-described matters, an object of the present invention is to provide a lower vehicle-body structure of an automotive vehicle which can improve the rigidity of the load transmission path where the side-collision load is transmitted, suppressing an increase of the number of parts.

The present invention is a lower vehicle-body structure of an automotive vehicle comprising a floor tunnel extending in a vehicle longitudinal direction, a floor panel provided at a lower portion of the vehicle on both outward sides, in a vehicle width direction, of the floor tunnel, a tunnel reinforcement provided at a lower-face side of the floor tunnel, and a seat-attaching bracket connecting the floor tunnel and the floor panel and supporting a seat where a passenger is seated, characterized in that the tunnel reinforcement comprises a front-side contact portion, a middle contact portion, and a rear-side contact portion which respectively contact the floor tunnel, and a first protrusion portion and a second protrusion portion which respectively protrude in a direction leaving from a lower face of the floor tunnel, the front-side contact portion, the first protrusion portion, the middle contact portion, the second protrusion portion, and the rear-side contact portion being positioned in order from a vehicle forward side and formed integrally, and the seat-attaching bracket comprises a flange portion which contacts the floor tunnel, the flange portion being connected to the front-side contact portion, the middle contact portion, and the rear-side contact portion of the tunnel reinforcement through the floor tunnel.

According to the present invention, the rigidity of the load transmission path where the side-collision load is transmitted can be improved, suppressing the increase of the number of parts. Specifically, since the first protrusion portion and the second protrusion portion are provided to protrude relative to the front-side contact portion, the middle contact portion, and the rear-side contact portion, the lower vehicle-body structure of the automotive vehicle can be configured such that a vertical section along the vehicle longitudinal direction of the tunnel reinforcement is of a roughly W shape.

Accordingly, an area of the cross section of the tunnel reinforcement can be larger, compared to a tunnel reinforcement which has a hat-shaped vertical section along the vehicle longitudinal direction. Thereby, the lower vehicle-body structure of the automotive vehicle can improve the rigidity of the tunnel reinforcement, thereby improving the mechanical strength of the floor tunnel.

Further, since the seat-attaching bracket is joined to the tunnel reinforcement through the floor tunnel, the strength of a joint portion of the seat-attaching bracket and the floor tunnel can be improved.

Thereby, the lower vehicle-body structure of the automotive vehicle can support the seat-attaching bracket by the tunnel reinforcement having the higher rigidity. Accordingly, the lower vehicle-body structure of the automotive vehicle can improve the rigidity of the load transmission path where the side-collision load is transmitted, suppressing the increase of the number of parts.

In an embodiment of the present invention, the seat-attaching bracket comprises an upper wall portion where a bead is provided, the bead being configured to extend in the vehicle width direction substantially at the same position, in the vehicle longitudinal direction, as the middle contact portion of the tunnel reinforcement.

According to this embodiment, the lower vehicle-body structure of the automotive vehicle can improve the rigidity of the upper wall portion of the seat-attaching bracket. Thereby, deformation of the seat-attaching bracket can be suppressed when the side-collision load is applied. Thus, by providing the bead at the upper wall portion of the seat-attaching bracket, the lower vehicle-body structure of the automotive vehicle can improve the rigidity of the load transmission path where the side-collision load is transmitted, suppressing the increase of the number of parts.

In another embodiment of the present invention, the upper wall portion of the seat-attaching bracket comprises a seat-attachment portion which is positioned at an outward side, in the vehicle width direction, thereof and to which the seat is attached, a stepped-down portion which is positioned at a portion thereof which is located on an inward side, in the vehicle width direction, of the seat-attachment portion and extends toward the floor tunnel, and a connection portion which is connected to an inward-side end, in the vehicle width direction, of the seat-attachment portion at an upper end thereof, extends downward from the upper end, and is connected to an outward-side end, in the vehicle width direction, of the stepped-down portion at a lower end thereof, and the bead is provided at the stepped-down portion of the upper wall portion of the seat-attaching bracket and configured to protrude upward and extend from the connection portion of the upper wall portion of the seat-attaching bracket toward the flange portion of the seat-attaching bracket.

According to this embodiment, the lower vehicle-body structure of the automotive vehicle can securely improve the rigidity of the seat-attaching bracket, suppressing the increase of the number of parts.

Specifically, since the weight of the passenger tends to act on a rear portion of the seat in a state where the passenger is seated, there is a problem that if the surface rigidity of the upper wall portion is low, the upper wall portion may be easily deformed due to vertically-directional vibration of the vehicle body which is generated during vehicle traveling in a case where the seat-attaching bracket supports the rear portion of the seat. In this case, when the automotive vehicle rides over a slope, for example, the upper wall portion of the seat-attaching bracket starts its deformation in an early stage due to the vibration of the vehicle body, so that there is a concern that an urethane cushion forming the seat may not sufficiently damp the vertically-directional vibration of the vehicle body, so that the vibration may be transmitted to the passenger improperly. Additionally, if the seat rear portion is made to swing in the vehicle vertical direction by the deformation of the upper wall portion, a seatback of the seat swings in the vehicle longitudinal direction in accordance with this vertically-directional swing. Thereby, a head portion of the passenger is forced to swing, so that there is a concern that the ride comfort of the passenger may be deteriorated.

According to this embodiment, however, since the connection portion is provided at the upper wall portion, the lower vehicle-body structure of the automotive vehicle is configured such that an area of the seat-attachment portion and an area of the stepped-down portion can be made respectively small and also the connection portion can be made to serve as a knot (reinforcing part) for the upper wall portion, so that deformation of the upper wall portion which may be caused by the vibration of the vehicle body during the vehicle traveling can be suppressed properly. Further, since the bead extending in the vehicle width direction is provided at the stepped-down portion, the lower vehicle-body structure of the automotive vehicle is configured such that the surface rigidity of the stepped-down portion against the vehicle-body vibration can be improved and also the support rigidity of the seat-attachment portion can be improved. Thereby, the surface rigidity of the upper wall portion of the seat-attaching bracket can be improved, compared to the upper wall portion having a roughly flat-plate shape. Accordingly, when the automotive vehicle rides over the slope, for example, it can be prevented that the upper wall portion of the seat-attaching bracket starts its deformation caused by the vehicle-body vibration in an early stage and also the damping performance of the urethane cushion forming the seat can be sufficiently achieved. Herein, since swinging of the seat both in the vehicle vertical direction and in the vehicle longitudinal direction can be suppressed by improvement of the surface rigidity of the upper wall portion, swinging of the head portion of the passenger is so suppressed that the ride comfort of the passenger can be improved properly. Additionally, since the bead provided at the stepped-down portion is provided to extend from the connection portion toward the flange portion, it can be prevented that a border between the stepped-down portion and the connection portion becomes a fragile (weak) part against the side-collision load. Therefore, when the side-collision load is applied to the seat-attaching bracket, it can be prevented by the bead provided at the stepped-down portion that the seat-attaching bracket is improperly bent and deformed with a starting point at the border between the stepped-down portion and the connection portion. Thus, the low vehicle-body structure of the automotive vehicle can securely improve the rigidity of the load transmission path where the side-collision load is transmitted, suppressing the increase of the number of parts, by providing the stepped-down portion at the upper wall portion of the seat-attaching bracket and providing the bead at the stepped-down portion.

In another embodiment of the present invention, the bead provided at the seat-attaching bracket is configured to protrude downward.

According to this embodiment, since the lower vehicle-body structure of the automotive vehicle can provide a larger surface area of the flange portion of the seat-attaching bracket, compared to a case where the bead protruding upward is provided at the stepped-down portion, the lower vehicle-body structure can improve the rigidity of the flange portion. Thus, the low vehicle-body structure of the automotive vehicle can more securely improve the rigidity of the load transmission path where the side-collision load is transmitted, suppressing the increase of the number of parts, by configuring the bead provided at the seat-attaching bracket to protrude downward.

In another embodiment of the present invention, a joint point of the middle contact portion of the tunnel reinforcement and the flange portion of the seat-attaching bracket is located at a higher level than a joint point of the front-side contact portion and the flange portion and a joint point of the rear-side contact portion and the flange portion.

According to this embodiment, a roughly-triangular imaginary plane which is made by connecting the joint point of the front-side contact portion and the flange portion, the joint point of the rear-side contact portion and the flange portion, and the joint point of the middle contact portion and the flange portion can be formed. Accordingly, when the side-collision load is transmitted from the seat-attaching bracket to the tunnel reinforcement, for example, the side-collision load can be transmitted via the roughly-triangular imaginary plane. Thereby, deformation of the flange portion which may be caused by the side-collision load can be suppressed more properly, compared to a case where the tunnel reinforcement and the flange portion of the seat-attaching bracket are joined at two joint points. Thus, the low vehicle-body structure of the automotive vehicle according to this embodiment can improve the rigidity of the load transmission path where the side-collision load is transmitted, suppressing the increase of the number of parts, by joining the middle contact portion and the flange portion at a higher level than the joint point of the front-side contact portion and the flange portion and the joint point of the rear-side contact portion and the flange portion.

In another embodiment of the present invention, the flange portion of the seat-attaching bracket comprises a portion which is joined to the front-side contact portion of the tunnel reinforcement, a portion which is joined to the middle contact portion of the tunnel reinforcement, and a portion which is joined to the rear-side contact portion of the tunnel reinforcement, which are formed integrally.

According to this embodiment, the rigidity of the flange portion of the seat-attaching bracket can be improved and the connection strength of the seat-attaching bracket and the floor tunnel can be further improved. Further, in a case where the portion of the flange portion joined to the middle contact portion is provided to extend from the upper wall portion of the seat-attaching bracket, for example, the lower vehicle-body structure of the automotive vehicle can be configured such that the upper wall portion of the seat-attaching bracket is supported by the portion joined to the front-side contact portion of the tunnel reinforcement, the portion joined to the middle contact portion of the tunnel reinforcement, and the portion joined to the rear-side contact portion of the tunnel reinforcement. Accordingly, in a state where the seat-attaching bracket is joined to the floor tunnel, the flange portion can support the upper wall portion more securely, compared to a case where the upper wall portion is supported only by the portion joined to the middle contact portion. Thereby, the rigidity of the seat-attaching bracket can be improved, so that the deformation of the upper wall portion which may be caused by the vehicle-body vibration during the vehicle traveling can be suppressed. Thus, the low vehicle-body structure of the automotive vehicle can more securely improve the rigidity of the load transmission path where the side-collision load is transmitted by the flange portion which comprises the portion joined to the front-side contact portion, the portion joined to the middle contact portion, and the portion joined to the rear-side contact portion, which are formed integrally.

Other features, aspects, and advantages of the present invention will become apparent from the following description which refers to the accompanying drawings.

DETAILED DESCRIPTION OF THE INVENTION

Figure 1:
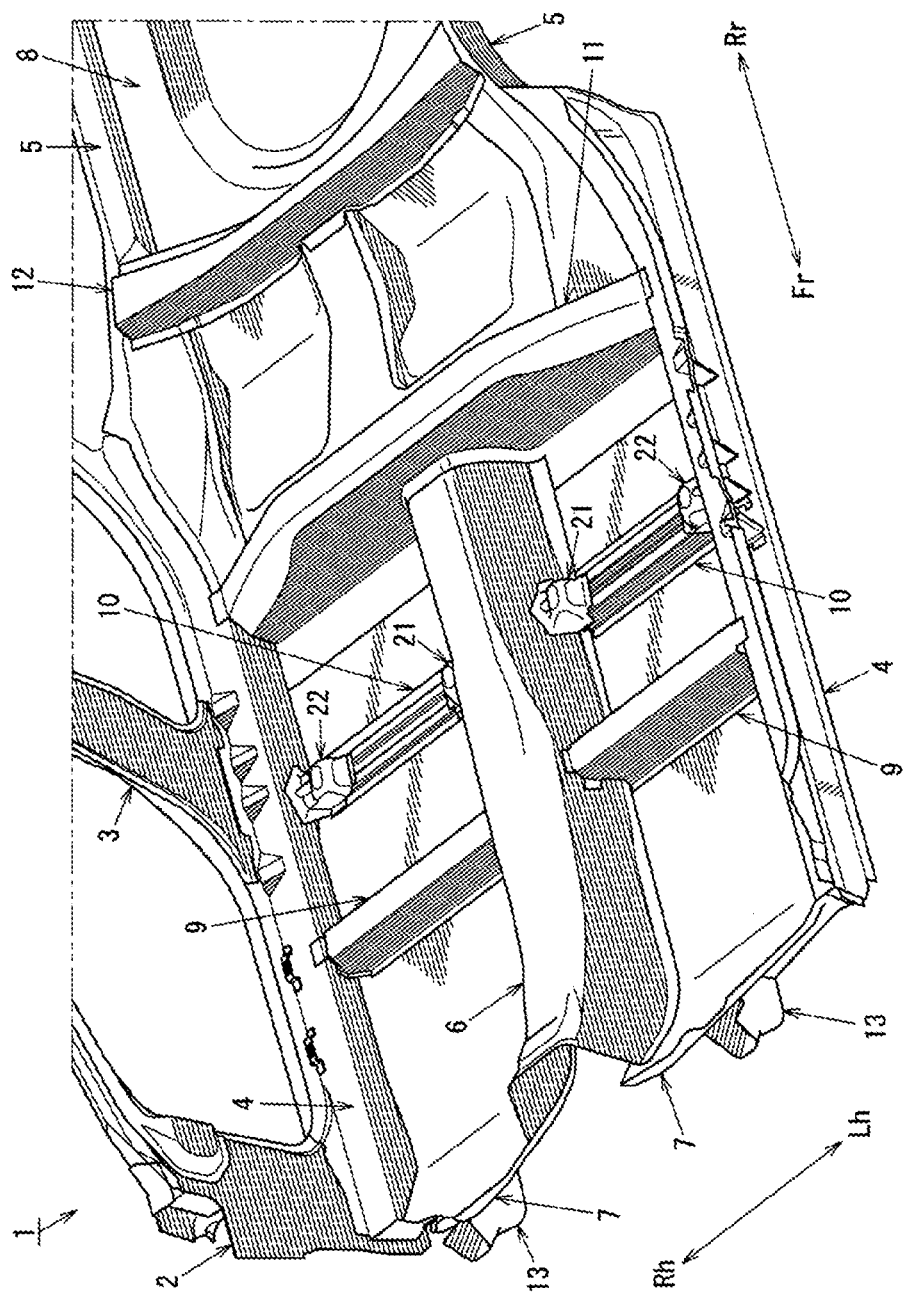
FIG. 1 is a perspective view showing an external appearance of a lower vehicle body of an automotive vehicle.
Figure 2:
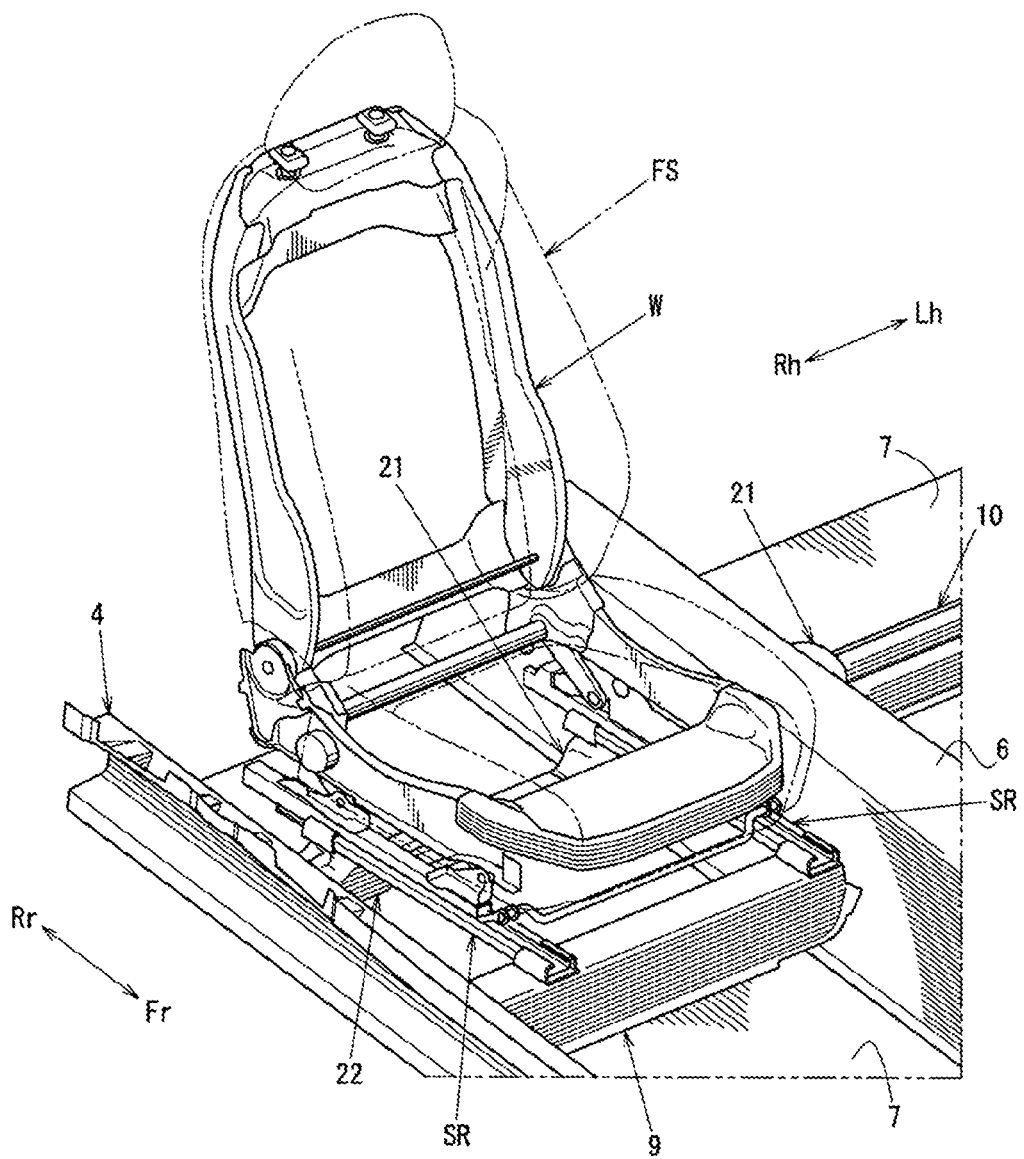
FIG. 2 is a perspective view showing an external appearance of the lower vehicle body of the automotive vehicle in a state where a seat is installed.

Hereafter, an embodiment of the present invention will be described referring to the drawings. Herein, FIG. 1 is a perspective view showing an external appearance of a lower vehicle body of an automotive vehicle 1, FIG. 2 is a perspective view showing an external appearance of the lower vehicle body of the automotive vehicle 1 in a state where a front seat FS is installed, FIG. 3 is a plan view showing an external appearance of a connection part of a floor tunnel 6 and a second cross member 10, FIG. 4 is a sectional view taken along line A-A of FIG. 3, FIG. 5 is a bottom view showing of the floor tunnel 6, and FIG. 6 is a perspective view showing an external appearance of a third tunnel reinforcement 17.

Figure 3:
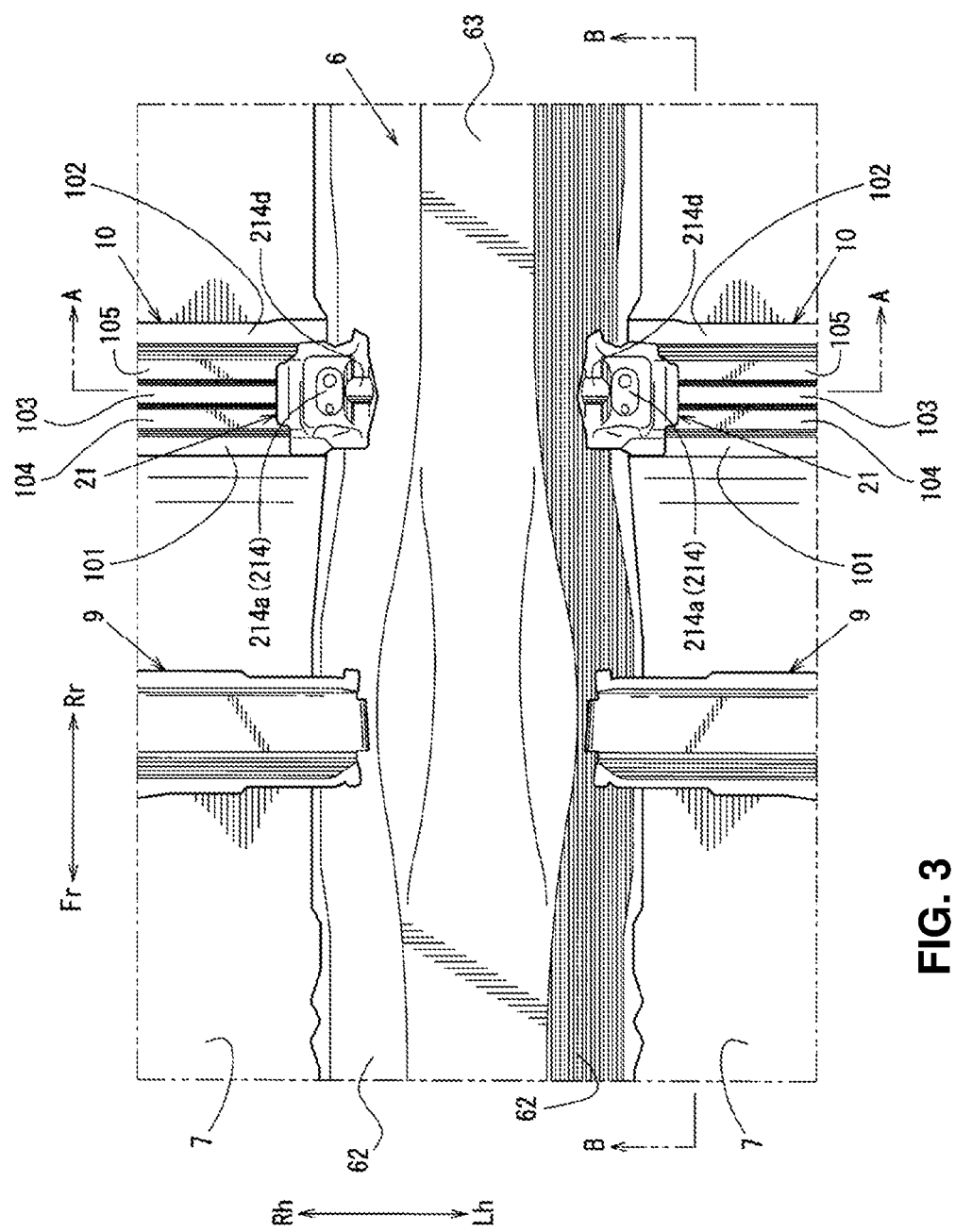
FIG. 3 is a plan view showing an external appearance of a connection part of a floor tunnel and a second cross member, when viewed from a vehicle upward side.
Figure 4:
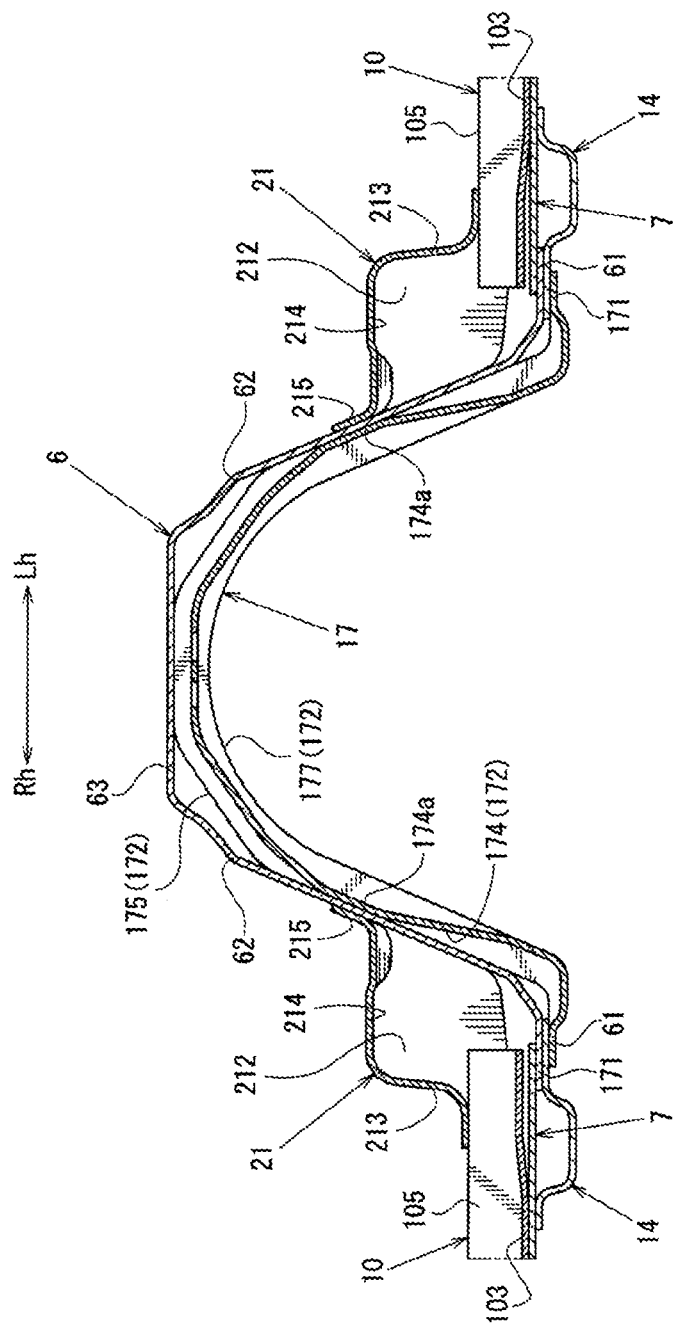
FIG. 4 is a sectional view taken along line A-A of FIG. 3.
Figure 7:
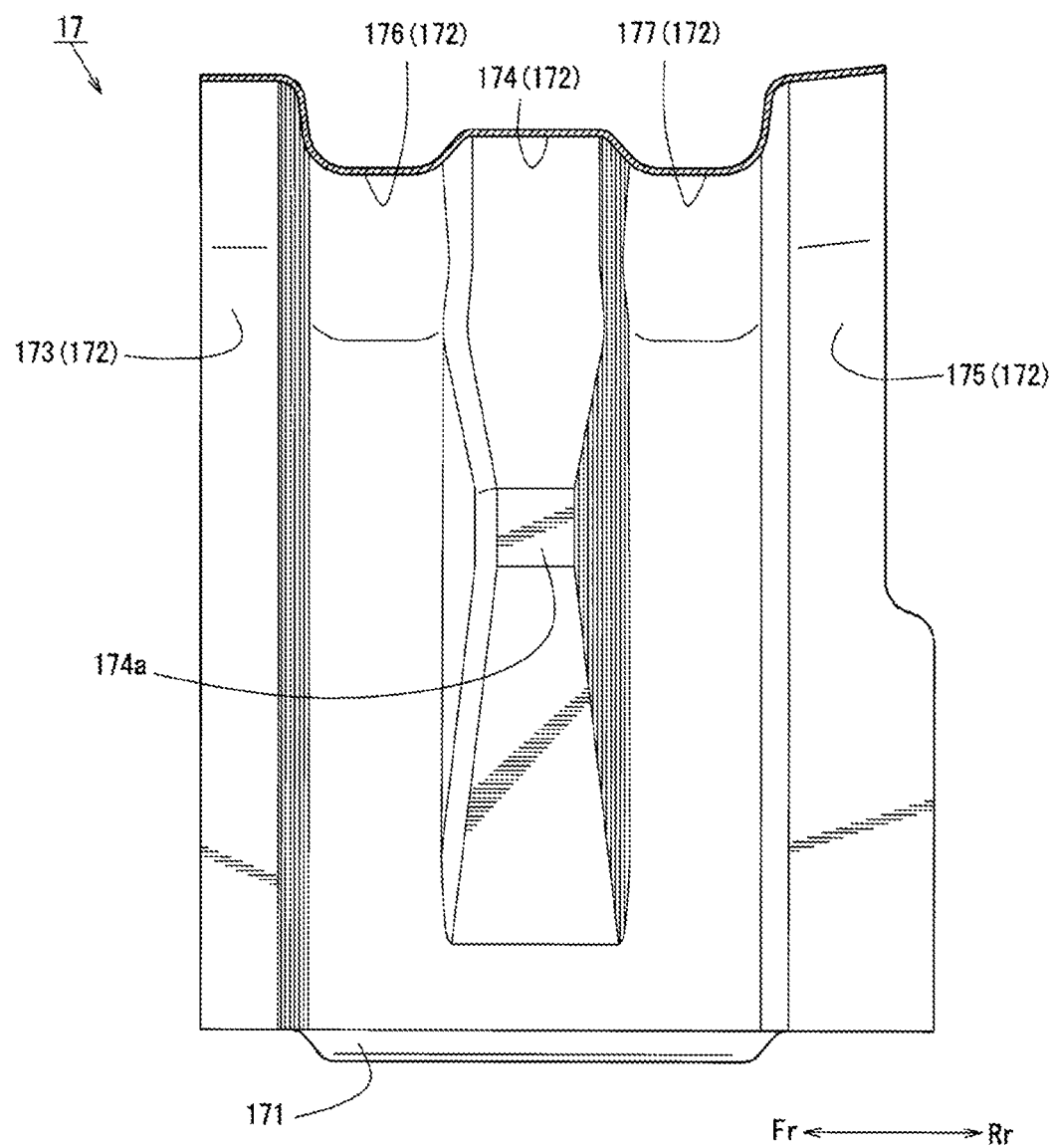
FIG. 7 is a sectional view showing a sectional shape of the tunnel reinforcement in a vertical section along a vehicle longitudinal direction.
Figure 8:
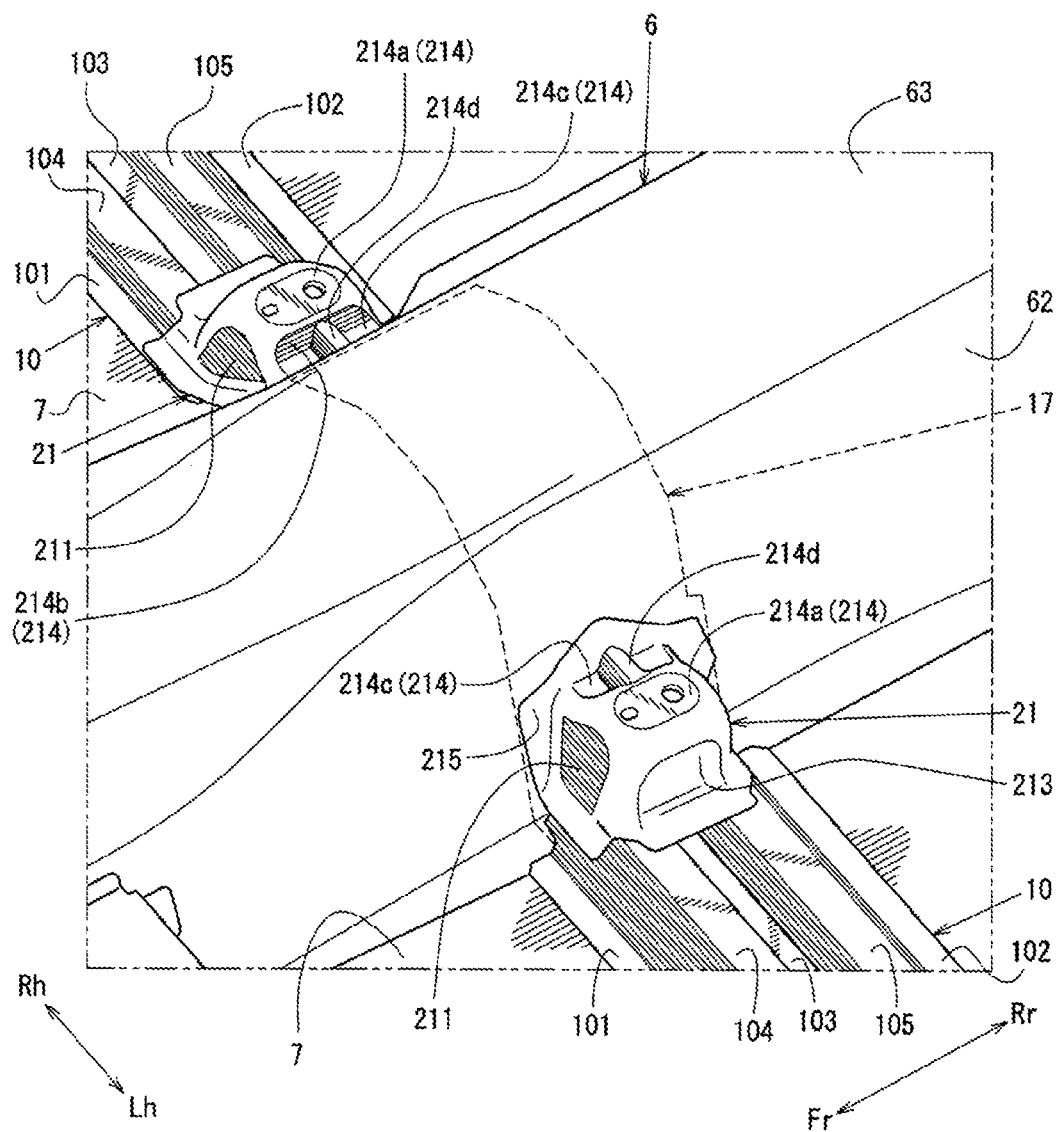
FIG. 8 is a perspective view showing the external appearance of the connection part of the floor tunnel and the second cross member.
Figure 9:
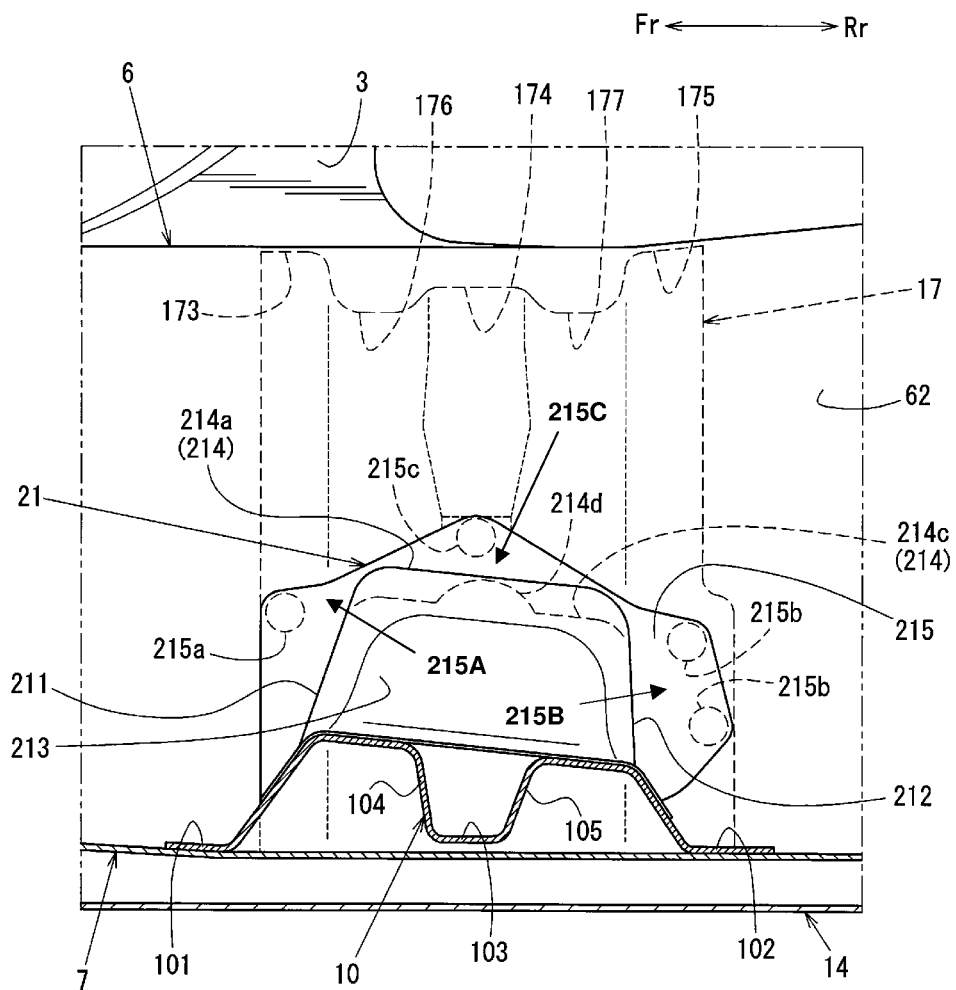
FIG. 9 is a sectional view showing the external appearance of the connection part of the floor tunnel and the second cross member, taken along line B-B of FIG. 3.
Figure 10:
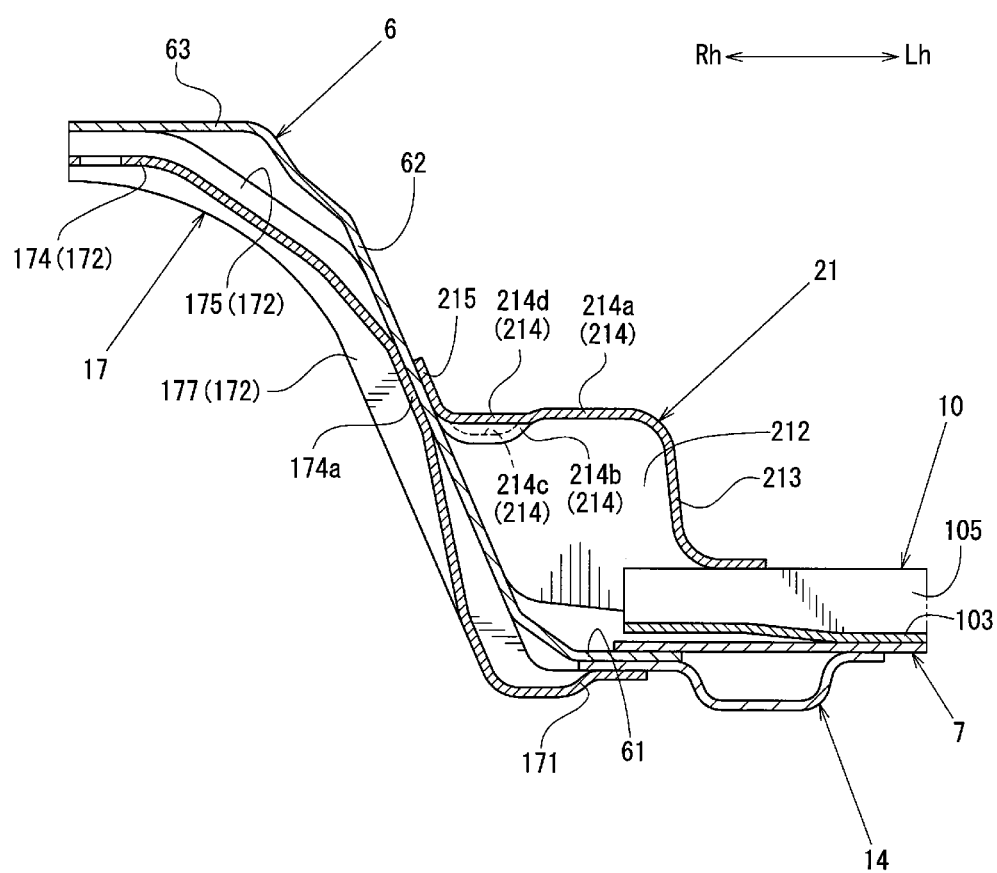
FIG. 10 is a sectional view of an enlarged major part of FIG. 4.

Further, FIG. 7 is a sectional view showing a sectional shape of the third tunnel reinforcement 17 in a vertical section along a vehicle longitudinal direction, FIG. 8 is a perspective view showing the external appearance of the connection part of the floor tunnel 6 and the second cross member 10, FIG. 9 is a sectional view showing the external appearance of the connection part of the floor tunnel 6 and the second cross member 10, taken along line B-B of FIG. 3, and FIG. 10 is a sectional view of an enlarged major part of FIG. 4.

Figure 5:
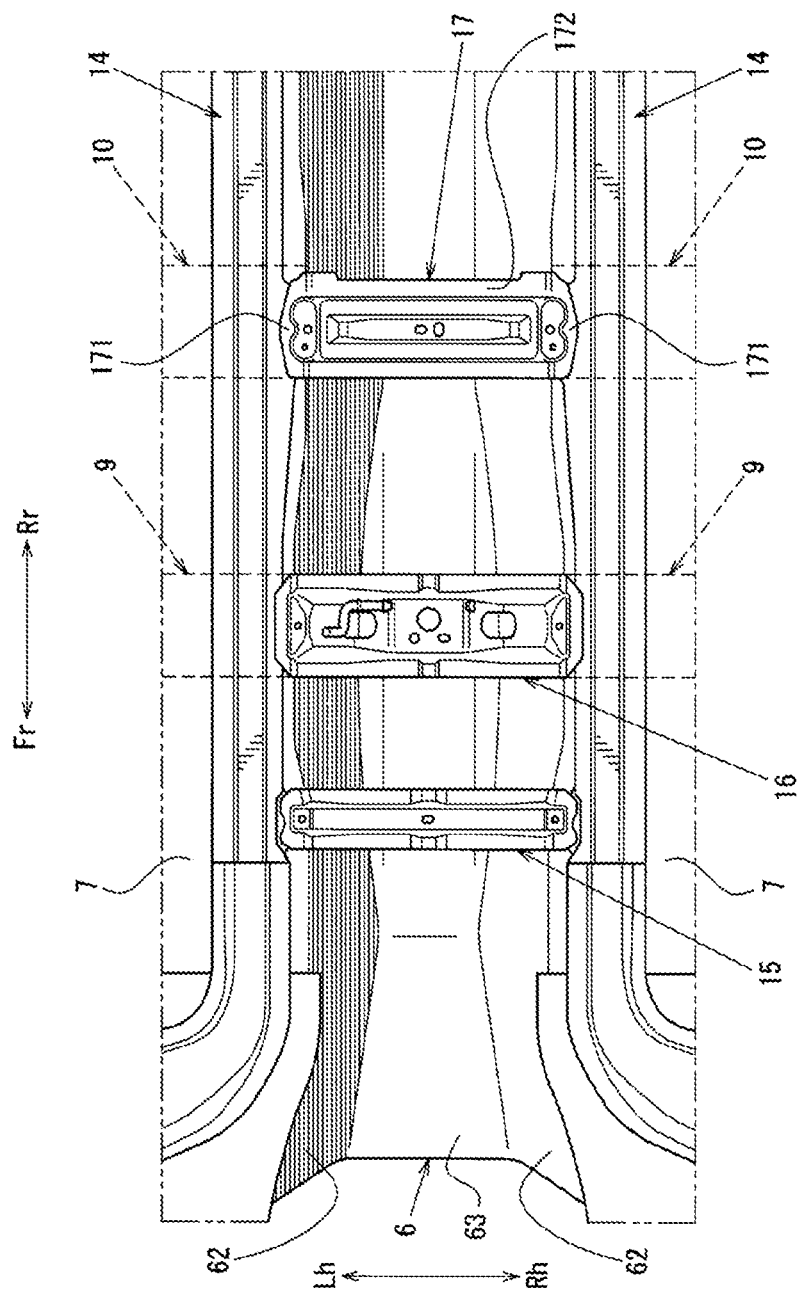
FIG. 5 is a bottom view showing an external appearance of the floor tunnel, when viewed from a vehicle downward side.
Figure 6:
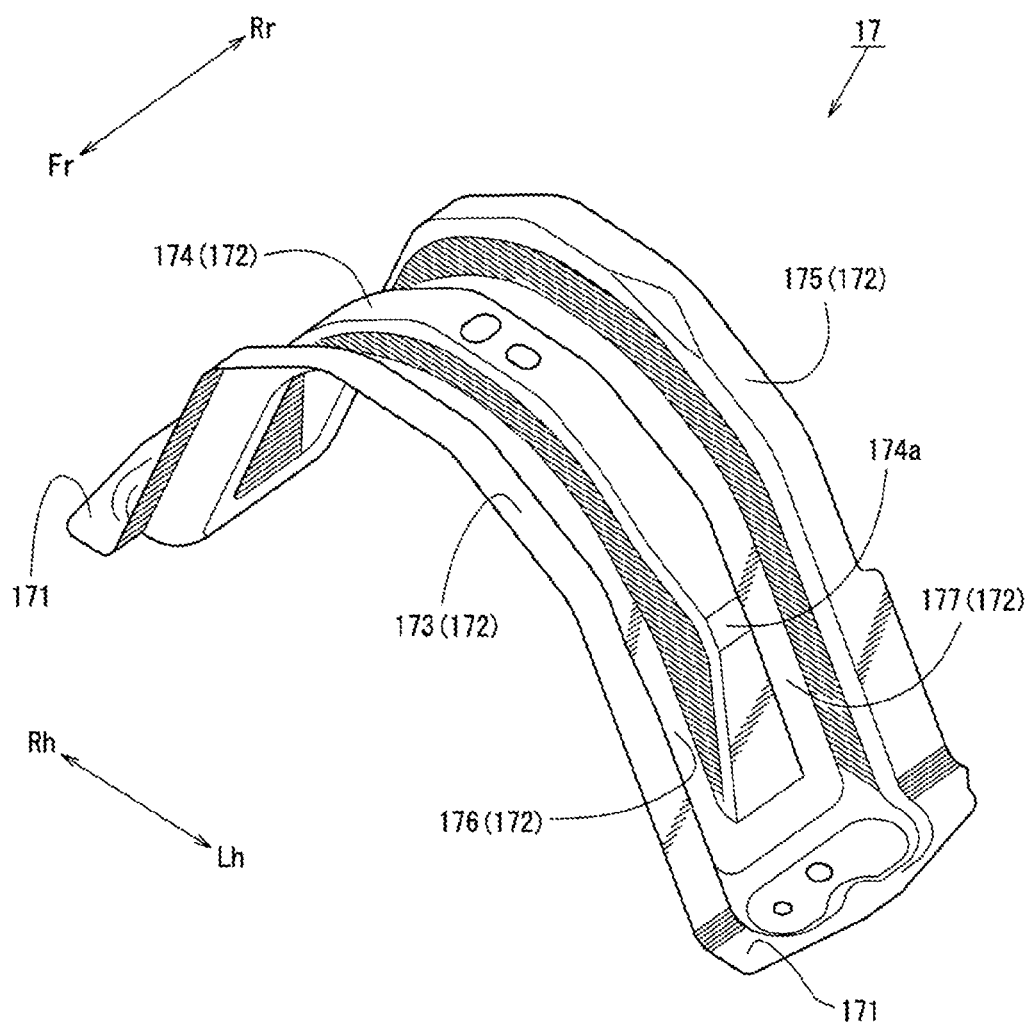
FIG. 6 is a perspective view showing an external appearance of a third tunnel reinforcement.

In FIG. 5, a first cross member 9 and the second cross member 10 are shown by broken lines, and the third tunnel reinforcement 17 is shown by a broken line in FIGS. 8 and 9. Further, in figures, arrows Fr, Rr show a longitudinal direction, the arrow Fr showing a forward side and the arrow Rr showing a rearward side.

Further, arrows Rh, Lh show a lateral direction, the arrow Rh showing a rightward side and the arrow Lh showing a leftward side. An inside of a cabin means an inward side in the vehicle width direction, and an outside of the vehicle means an outward side in the vehicle width direction. In addition, an upper side of FIG. 1 means an upward side in a vehicle vertical direction, and a lower side of FIG. 1 means a downward side in the vehicle vertical direction.

The automotive vehicle 1 of the present embodiment is configured, as shown in FIG. 1, such that a frame of a lower vehicle body thereof is constituted by a pair of right-and-left hinge pillars 2 which support front doors (not illustrated) so as to open/close the front doors for passenger's ingress/egress, a pair of right-and-left center pillars 3 which support rear doors (not illustrated) so as to open/close the rear doors, a pair of right-and-left side sills 4 which lower portions of the hinge pillars 2 and lower portions of the center pillars 3 are joined to and extend in the vehicle longitudinal direction, and a pair of right-and-left rear side frames 5 which extend rearward from rear ends of the side sills 4.

Further, the automotive vehicle 1 is configured, as shown in FIG. 1, such that a partition wall which partitions the cabin from the outside of the vehicle is constituted by a floor tunnel 6 which is provided substantially at a center position, in the vehicle width direction, between the right-and-left side sills 4, a floor panel 7 which is provided between each side sill 4 and the floor tunnel 6, and a rear floor panel 8 which forms a floor face of a baggage room between the right-and-left rear side frames 5.

Additionally, as shown in FIG. 1, the automotive vehicle 1 comprises the first cross member 9, the second cross member 10, a third cross member 11, and a fourth cross member 12, which are arranged as reinforcing members to reinforce a frame of the lower vehicle body, in order from a vehicle forward side, on an upper face of each of the floor panels 7 between the right-and-left side sills 4 and also between the right-and-left rear side frames 5.

Moreover, the automotive vehicle 1 is configured, as shown in FIG. 2, such that the front seat FS for seating of a passenger is installed via a pair of right-and-left seat rails SR which extend between the first cross member 9 and the second cross member 10. The front seat FS comprises a seat frame W which is slidably, in the vehicle longitudinal direction, supported by the seat rails SR, an urethane cushion (not illustrated) which is attached to the seat frame W, a seat skin (not illustrated) and others.

The hinge pillar 2 has a closed cross section extending in the vehicle vertical direction, which is not illustrated, and its lower portion is joined to a front end of the side sill 4. The center pillar 3 is configured such that a width, in the vehicle longitudinal direction, thereof becomes gradually larger toward its lower part as shown in FIG. 1.

The center pillar 3 comprises a side frame outer panel, a center pillar outer panel, and a center pillar inner panel, which are joined from the outward side in this order in a vertical section along the vehicle width direction, which is not illustrated.

Further, the side sill 4 comprises a side sill outer panel which is positioned on the outward side and a side sill inner panel which is positioned on the inward side, which is configured to have a roughly-rectangular closed cross section in the vertical section along the vehicle width direction, specific illustration of which is omitted.

As shown in FIG. 1, the floor panel 7 is a longitudinally-long panel member having a thickness in the vehicle vertical direction and configured to form a bottom face of the cabin. This floor panel 7 is joined to an inward-side face, in the vehicle width direction, of the side sill 4 at an outward-side edge portion, in the vehicle width direction, thereof.

Further, as shown in FIG. 1, to a lower face of the floor panel 7 are joined a floor frame 13 which extends substantially in the vehicle longitudinal direction such that its front end is positioned on the outward side, in the vehicle width direction, of the vehicle body and its rear part is positioned toward the inward side, in the vehicle width direction, of the vehicle body and a tunnel frame 14 which extends in the vehicle longitudinal direction along an inward-side edge portion, in the vehicle width direction, of the floor panel 7 (see FIGS. 4 and 5).

The floor frame 13 is configured to have a roughly hat-shaped cross section which opens upward in the vertical section along the vehicle width direction as shown in FIG. 1. As shown in FIG. 4, the tunnel frame 14 is configured to have a roughly hat-shaped cross section which opens downward in the vertical section along the vehicle width direction, and forms a roughly-rectangular closed cross section together with the floor panel 7 and the floor tunnel 6 which will be described.

Specifically, as shown in FIG. 4, the tunnel frame 14 is joined to a lower face of the floor tunnel 6 at an inward-side flange portion, in the vehicle width direction, thereof, and also joined to the lower face of the floor panel 7 at an outward-side flange portion, in the vehicle width direction, thereof, so that the roughly-rectangular closed cross section is formed.

Also, the floor tunnel 6 is, as shown in FIGS. 1 and 4, configured to have a roughly hat-shaped cross section which extends in the vehicle longitudinal direction and opens upward in the vertical section along the vehicle width direction.

Specifically, as shown in FIGS. 3 and 4, the floor tunnel 6 comprises a pair of right-and-left flange portions 61 which are joined to the respective lower faces of the floor panels 7, vertical wall portions 62 which are provided to rise upward and inward from the flange portions 61, and a top plate portion 63 which interconnects respective upper ends of the vertical wall portions 62, which are integrally formed.

Moreover, as shown in FIGS. 4 and 5, at the lower face of the floor tunnel 6 are provided a first tunnel reinforcement 15, a second tunnel reinforcement 16, and a third tunnel reinforcement 17 which are respectively provided to connect each inward-side edge portion, in the vehicle width direction, of the floor panels 7.

The first tunnel reinforcement 15 is, as shown in FIG. 5, provided at the lower face of the floor tunnel 6 such that this reinforcement 15 interconnects the respective inward-side edge portions of the floor panels 7 at a position located in front of the first cross member 9 which will be described later.

The first tunnel reinforcement 15 has a specified longitudinal length in the vehicle longitudinal direction, and is configured to protrude upward such that its vertical section along the vehicle width direction is of a roughly hat shape. This first tunnel reinforcement 15 is joined to the floor panels 7 at its lower ends and also joined to the lower face of the floor tunnel 6 at its upward-protruding portion.

The second tunnel reinforcement 16 is, as shown in FIG. 5, provided at the lower face of the floor tunnel 6 such that it interconnects the respective inward-side edge portions of the floor panels 7 substantially at the same position, in the vehicle longitudinal direction, as the first cross member 9.

The second tunnel reinforcement 16 has substantially the same longitudinal length, in the vehicle longitudinal direction, as the first cross member 9 and is configured to protrude upward such that its vertical section along the vehicle width direction is of a roughly hat shape.

This first tunnel reinforcement 16 is joined to the respective flange portions 61 of the floor tunnel 6 via the tunnel frames 14 at its lower ends and also joined to the lower face of the floor tunnel 6 at its upward-protruding portion.

The third tunnel reinforcement 17 is, as shown in FIG. 5, provided at the lower face of the floor tunnel 6 such that it interconnects the respective inward-side edge portions of the floor panels 7 substantially at the same position, in the vehicle longitudinal direction, as the second cross member 10.

As shown in FIGS. 4 and 5, the third tunnel reinforcement 17 has substantially the same longitudinal length, in the vehicle longitudinal direction, as the second cross member 10 and is configured to protrude upward such that its vertical section along the vehicle width direction is of a roughly hat shape.

Specifically, as shown in FIGS. 4 and 6, the third tunnel reinforcement 17 comprises tunnel reinforcement flanges 171 which are joined to the flange portions 61 of the floor tunnel 6 via the tunnel frames 14 and a tunnel reinforcement body 172 which is configured in a roughly oval-arc shape, in the elevational view, such that it protrudes upward from respective inward-side edge portions of the tunnel reinforcement flanges 171, which are formed integrally. This tunnel reinforcement body 172 is configured, as shown in FIGS. 6 and 7, such that its vertical section along the vehicle longitudinal direction is of a roughly W shape.

Specifically, as shown in FIGS. 6 and 7, the tunnel reinforcement body 172 comprises a front-side contact portion 173, a middle contact portion 174, and a rear-side contact portion 175 which respectively contact the floor tunnel 6, and a first protrusion portion 176 and a second protrusion portion 177 which respectively protrude in a direction leaving from the lower face of the floor tunnel 6, wherein the front-side contact portion 173, the first protrusion portion 176, the middle contact portion 174, the second protrusion portion 177, and the rear-side contact portion 175 are positioned in order from the vehicle forward side and formed integrally so as to form a roughly W shaped cross section.

The front-side contact portion 173 is, as shown in FIGS. 4, 6 and 7, configured in a roughly oval-arc shape in the elevational view so as to contact the vertical wall portions 62 and the top plate portion 63 of the floor tunnel 6. This front-side contact portion 173 is joined at respective contact points to the vertical wall portions 62 and the top plate portion 63.

The middle contact portion 174 is, as shown in FIGS. 4, 6 and 7, configured in a roughly oval-arc shape, in the elevational view, such that its top portion is positioned at a lower level than the top portion of the front-side contact portion 173, and a portion of the middle contact portion 174 which faces, in the vehicle width direction, the vertical wall portion 62 of the floor tunnel 6 is configured in a roughly flat-plate shape such that it protrudes outward so as to contact the vertical wall portion 62.

This middle contact portion 174 has protrusion portions 174a which protrude outward in the vehicle width direction, and the protrusion portions 174a are joined to the vertical wall portions 62 of the floor tunnel 6.

The rear-side contact portion 175 is, as shown in FIGS. 4, 6 and 7, configured in a roughly oval-arc shape in the elevational view so as to contact the vertical wall portions 62 and the top plate portion 63 of the floor tunnel 6. This rear-side contact portion 175 is joined at respective contact points to the vertical wall portions 62 and the top plate portion 63.

Herein, the rear-side contact portion 175 is configured, as shown in FIGS. 6 and 7, such that its lower part which faces the vertical wall portion 62 of the floor tunnel 6 has a longer length, in the vehicle longitudinal direction, than its upper part.

As shown in FIGS. 4, 6 and 7, the first protrusion portion 176 is configured in a roughly recessed-groove shape such that it protrudes in a direction leaving from the lower face of the floor tunnel 6, i.e., downward and inward, at a position located between the front-side contact portion 173 and the middle contact portion 174.

More specifically, the first protrusion portion 176 is configured in a roughly oval-arc shape, in the elevational view, such that its top portion is positioned at a lower level than the top portion of the front-side contact portion 173, and its vertical section along the vehicle longitudinal direction is of a recess shape which opens upward.

As shown in FIGS. 4, 6 and 7, the second protrusion portion 177 is configured in a roughly recessed-groove shape such that it protrudes in the direction leaving from the lower face of the floor tunnel 6, i.e., downward and inward, at a position located between the middle contact portion 174 and the rear-side contact portion 175.

More specifically, the second protrusion portion 177 is configured in a roughly oval-arc shape, in the elevational view, such that its top portion is positioned substantially at the same level as the top portion of the first protrusion portion 176, and its vertical section along the vehicle longitudinal direction is of a recess shape which opens upward.

Further, as shown in FIG. 1, the first cross member 9 is provided at the upper face of the floor panel 7 such that it interconnects the right-and-left side sills 4 substantially at a central position, in the vehicle longitudinal direction, between the hinge pillar 2 and the center pillar 3.

The first cross member 9 is configured to have a roughly hat-shaped cross section which opens upward in the vertical section along the vehicle width direction, and forms a closed cross section extending in the vehicle width direction together with the floor panel 7, which is not specifically illustrated. Herein, respective front ends of the pair of right-and-left seat rails SR supporting the front seat FS are fixedly fastened to an upper face portion of the first cross member 9 (see FIG. 2).

The second cross members 10 are, as shown in FIG. 1, provided on the upper face of the floor panels 7 such that these members 10 interconnect the right-and-left side sills via the floor tunnel 6 substantially at the same position, in the vehicle longitudinal direction, as a center, in the vehicle longitudinal direction, of the center pillar 3. Herein, the second cross member 10 is joined to a portion of the floor panel 7 which slants rearward and downward at its lower face.

As shown in FIGS. 8 and 9, the second cross member 10 is configured to have a roughly M-shaped cross section in the vertical section along the vehicle longitudinal direction, and comprises a front-side flange portion 101 which is positioned at the forward side of the vehicle body and joined to the floor panel 7, a rear-side flange portion 102 which is positioned at the rearward side of the vehicle body and joined to the floor panel 7, a central flange portion 103 which is positioned between the front-side flange portion 101 and the rear-side flange portion 102, a front-side protrusion portion 104 which protrudes upward at a position located between the front-side flange portion 101 and the central flange portion 103, and a rear-side protrusion portion 105 which protrudes upward at a position located between the central flange 103 and the rear-side flange portion 102, where are formed integrally.

The above-described second cross member 10 is, as shown in FIG. 9, joined to the upper face of the floor panel 7 substantially at the same position, in the vehicle longitudinal direction, as the middle contact portion 174 of the tunnel reinforcement 17, similarly to the central flange portion 103.

Further, the second cross member 10 is, as shown in FIG. 1, connected to the floor tunnel 6 via a first seat-attaching bracket 21 positioned on the inward side, in the vehicle width direction, of the vehicle body, and connected to the side sill 4 via a second seat-attaching bracket 22 positioned on the outward side, in the vehicle width direction, of the vehicle body. Herein, respective rear ends of the pair of right-and-left seat rails SR supporting the front seat FS are fixedly fastened to the first seat-attaching bracket 21 and the second seat-attaching bracket 22 (see FIG. 2).

The third cross member 11 is, as shown in FIG. 1, provided on the upper face of the floor panel 7 at a position located near a rear end of the floor panel 7, interconnecting the side sills 4 in the vehicle width direction. The third cross member 11 is joined to the side sills 4 and the floor panel 7.

The fourth cross member 12 is, as shown in FIG. 1, provided on an upper face of the floor panel 8 at a position which is spaced rearward apart from the third cross member 11, interconnecting the rear side frames 5 in the vehicle width direction. The fourth cross member 12 is joined to the rear side frame 5 and the rear floor panel 8.

Hereafter, the above-described first seat-attaching bracket 21 will be described. Since the second seat-attaching member 22 has a structure which is roughly symmetrical to that of the first seat-attaching bracket 21, its specific description is omitted.

As shown in FIGS. 8 through 10, the first seat-attaching bracket 21 has a roughly boxy shape which opens inward and downward, and its vertical section along the vehicle width direction is configured to form a closed cross section together with the floor tunnel 6 and the floor panel 7.

The first seat-attaching bracket 21 is configured such that its front end is located substantially at the same longitudinal position as a front end of the third tunnel reinforcement 17, and its rear end is located substantially at the same longitudinal position as a rear end of the third tunnel reinforcement 17.

More specifically, as shown in FIGS. 8 through 10, the first seat-attaching bracket 21 comprises a front wall portion 211 which is positioned at the forward side of the vehicle body, a rear wall portion 212 which is provided rearward to face the front wall portion 211, a side wall portion 213 which connects an inward-side edge portion of the front wall portion 211 and an inward-side edge portion of the rear wall portion 212, an upper wall portion 214 which connects an upper end of the front wall portion 211 and an upper end of the rear wall portion 212, and a flange portion 215 which is joined to the floor tunnel 6, which are formed integrally.

The front wall portion 211 is configured in a roughly flat-plate shape and slightly slants such that its lower end is positioned in front of its upper end. This front wall portion 211 is joined to a front face of the front-side protrusion portion 104 of the second cross member 10 or the front-side flange portion 101 at a portion thereof which extends from its rear end.

The rear wall portion 212 is configured in a roughly flat-plate shape and slightly slants such that its lower end is positioned in back of its upper end. This rear wall portion 212 is joined to a rear face of the rear-side protrusion portion 105 of the second cross member 10 at a portion thereof which extends from its lower end.

The side wall portion 213 is configured in a roughly flat-plate shape and slightly slants such that its lower end is positioned on the inward side, in the vehicle width direction, of its upper end. This side wall portion 213 is joined to an upper face of the front-side protrusion portion 104 and an upper face of the rear-side protrusion portion 105 of the second cross member 10 at a portion thereof which is bent outward from its lower end.

The upper wall portion 214 is, as shown in FIGS. 8 through 10, arranged at the outward side, in the vehicle width direction, of the vehicle body, and comprises an attachment portion 214a which is a plane portion where the rear ends of the seat rails SR are attached, a slant portion 214b (corresponds to a "connection portion" in the claim) which slants outward and downward from an inward-side edge portion of the attachment portion 214a, and a stepped-down portion 214c which extends inward, in the vehicle width direction, from a lower end of the slant portion 214b.

Further, as shown in FIGS. 8 through 10, the stepped-down portion 214c has a bead 214d which protrudes roughly upward at a roughly central position, in the vehicle longitudinal direction, thereof and extends in the vehicle width direction from the slant portion 214b to the flange portion 215.

More specifically, the bead 214d is provided to protrude roughly upward along an imaginary line which extends from the central flange portion 103 of the second cross member 10 toward the protrusion portion 174a of the third tunnel reinforcement 17 as shown in FIG. 9.

In other words, the protrusion portion 174a of the third tunnel reinforcement 17, the central flange portion 103 of the second cross member 10, and the bead 214d of the first seat-attaching bracket 21 are provided substantially at the same position in the vehicle longitudinal direction. Herein, the bead 214d protrudes such that its top portion is located at a slightly lower level than an upper face of the attachment portion 214a.

As shown in FIG. 9, the flange portion 215 is integrally formed, in a side view, by a portion 215A which extends forward from an inward-side edge portion, in the vehicle width direction, of the front wall portion 211, a portion 215B which extends rearward from an inward-side edge portion, in the vehicle width direction, of the rear wall portion 212, and a portion 215C which extends upward from an inward-side edge portion, in the vehicle width direction, of the upper wall portion 214.

The above-described first seat-attaching bracket 21 is joined to the vertical wall portion 62 of the floor tunnel 6 via a front-side joint point 215a, two rear-side joint points 215b, and a middle joint point 215c which is positioned above the joint points 215a, 215b of the flange portion 215 as shown by circles illustrated by a broken line in FIG. 9.

The front-side joint point 215a is provided at the portion 215A of the flange portion 215 which extends forward from the front wall portion 211 in the side view as shown in FIG. 9. The first seat-attaching bracket 21 is joined to the vertical wall portion 62 of the floor tunnel 6 at the front-side joint point 215a of the flange portion 215, and joined to the front-side contact portion 173 of the third tunnel reinforcement 17 via the vertical wall portion 62.

As shown in FIG. 9, the two rear-side joint points 215b, which are spaced apart from each other in the vehicle vertical direction, are provided at the portion 215B of the flange portion 215 which extends rearward from the rear wall portion 212 in the side view. Herein, the upper-side point of the two rear-side joint points 215b is located substantially at the same level as the front-side joint point 215a.

The first seat-attaching bracket 21 is joined to the vertical wall portion 62 of the floor tunnel 62 of the floor tunnel 6 at the rear-side joint points 215b of the flange portion 215, and joined to the rear-side contact portion 175 of the third tunnel reinforcement 17 via the vertical wall portion 62.

As shown in FIG. 9, the middle joint point 215c is provided at the portion 215C of the flange portion 215 which extends upward from the upper wall portion 214 in the side view. The first seat-attaching bracket 21 is joined to the vertical wall portion 62 of the floor tunnel 6 and the protrusion portion 174a of the third tunnel reinforcement 17 at the middle joint point 215c of the flange portion 215.

The above-described low vehicle-body structure of the automotive vehicle 1 can improve the rigidity of the load transmission path where the side-collision load is transmitted, suppressing an increase of the number of parts. Specifically, since the first protrusion portion 176 and the second protrusion portion 177 are provided to protrude relative to the front-side contact portion 173, the middle contact portion 174, and the rear-side contact portion 175, the lower vehicle-body structure of the automotive vehicle 1 can be configured such that the vertical section along the vehicle longitudinal direction of the third tunnel reinforcement 17 is of the roughly W shape.

Accordingly, an area of the cross section of the third tunnel reinforcement 17 can be larger, compared to the third tunnel reinforcement which has a hat-shaped vertical section along the vehicle longitudinal direction. Thereby, the lower vehicle-body structure of the automotive vehicle 1 can improve the rigidity of the third tunnel reinforcement 17, thereby improving the mechanical strength of the floor tunnel 6.

Further, since the first seat-attaching bracket 21 is joined to the third tunnel reinforcement 17 through the floor tunnel 6, the strength of the joint portion of the first seat-attaching bracket 21 and the floor tunnel 6 can be improved.

Thereby, the lower vehicle-body structure of the automotive vehicle 1 can support the first seat-attaching bracket 21 by the third tunnel reinforcement 17 having the higher rigidity. Accordingly, the lower vehicle-body structure of the automotive vehicle 1 can improve the rigidity of the load transmission path where the side-collision load is transmitted, suppressing the increase of the number of parts.

Further, since the upper wall portion 214 of the first seat-attaching bracket 21 is provided with the bead 214*d* which is configured to extend in the vehicle width direction substantially at the same position, in the vehicle longitudinal direction, as the middle contact portion 174 of the third tunnel reinforcement 17, the lower vehicle-body structure of the automotive vehicle 1 can improve the rigidity of the upper wall portion 214 of the first seat-attaching bracket 21. Thereby, deformation of the first seat-attaching bracket 21 can be suppressed when the side-collision load is applied.

Thus, by providing the bead 214*d* at the upper wall portion 214 of the first seat-attaching bracket 21, the lower vehicle-body structure of the automotive vehicle 1 can improve the rigidity of the load transmission path where the side-collision load is transmitted, suppressing the increase of the number of parts.

Also, the upper wall portion 214 of the first seat-attaching bracket 21 comprises the seat-attachment portion 214*a* where the front seat FS is attached, the stepped-down portion 214*c* which is positioned at the portion located on the inward side, in the vehicle width direction, of the seat-attachment portion 214*a* and extends toward the floor tunnel 6, and the slant portion 214*b* which is connected to the inward-side end, in the vehicle width direction, of the seat-attachment portion 214*a* at its upper end, extends downward from the upper end, and is connected to the outward-side end, in the vehicle width direction, of the stepped-down portion 214*c* at its lower end, and the bead 214*d* is provided at the stepped-down portion 214*c* and configured to protrude upward and extend from the slant portion 214*b* toward the flange portion 215. Thereby, the lower vehicle-body structure of the automotive vehicle 1 can securely improve the rigidity of the first seat-attaching bracket 21, suppressing the increase of the number of parts.

Specifically, since the weight of the passenger tends to act on the rear portion of the front seat FS in a state where the passenger is seated, there is the problem that if the surface rigidity of the upper wall portion of the first seat-attaching bracket 21 is low, the upper wall portion may be easily deformed due to vertically-directional vibration of the vehicle body which is generated during vehicle traveling.

In this case, when the automotive vehicle 1 rides over the slope, for example, the upper wall portion of the first seat-attaching bracket 1 starts its deformation in the early stage due to the vibration of the vehicle body, so that there is the concern that the urethane cushion forming the front seat FS may not sufficiently damp the vertically-directional vibration of the vehicle body, so that the vibration may be transmitted to the passenger improperly.

Additionally, if the rear portion of the front seat FS is made to swing in the vehicle vertical direction by the deformation of the upper wall portion, the seatback of the seat swings in the vehicle longitudinal direction in accordance with this vertically-directional swing. Thereby, the head portion of the passenger is forced to swing, so that there is the concern that the ride comfort of the passenger may be deteriorated.

According to the above-described embodiment, however, since the slant portion 214*b* is provided at the upper wall portion 214, the lower vehicle-body structure of the automotive vehicle 1 is configured such that the area of the seat-attachment portion 214*b* and the area of the stepped-down portion 214*c* can be made respectively small and also the slant portion 214*b* can be made to serve as the knot (reinforcing part) for the upper wall portion 214, so that deformation of the upper wall portion 214 which may be caused by the vibration of the vehicle body during the vehicle traveling can be suppressed properly.

Further, since the bead 214*d* extending in the vehicle width direction is provided at the stepped-down portion 214*c*, the lower vehicle-body structure of the automotive vehicle 1 is configured such that the surface rigidity of the stepped-down portion 214*c* against the vehicle-body vibration can be improved and also the support rigidity of the seat-attachment portion 214*a* can be improved.

Thereby, the surface rigidity of the upper wall portion 214 of the first seat-attaching bracket 21 can be improved, compared to the upper wall portion 214 having the roughly flat-plate shape. Accordingly, when the automotive vehicle 1 rides over the slope, for example, it can be prevented that the upper wall portion 214 of the first seat-attaching bracket 21 starts its deformation caused by the vehicle-body vibration in the early stage and also the damping performance of the urethane cushion forming the front seat FS can be sufficiently achieved.

Herein, since swinging of the front seat FS both in the vehicle vertical direction and in the vehicle longitudinal direction can be suppressed by improvement of the surface rigidity of the upper wall portion 214, swinging of the head portion of the passenger is so suppressed that the ride comfort of the passenger can be improved properly.

Additionally, since the bead 214*d* provided at the stepped-down portion 214*c* is provided to extend from the slant portion 214*d* toward the flange portion 215, it can be prevented that the border between the stepped-down portion 214*c* and the slant portion 214*b* becomes the fragile (weak) part against the side-collision load.

Therefore, when the side-collision load is applied to the first seat-attaching bracket 21, it can be prevented by the bead 214*d* provided at the stepped-down portion 214*c* that the first seat-attaching bracket 21 is improperly bent and deformed with the starting point at the border between the stepped-down portion 214*c* and the slant portion 214*b*.

Thus, the low vehicle-body structure of the automotive vehicle 1 can securely improve the rigidity of the load transmission path where the side-collision load is transmitted, suppressing the increase of the number of parts, by providing the stepped-down portion 214*c* at the upper wall portion 214 of the first seat-attaching bracket 21 and providing the bead 214*d* at the stepped-down portion 214*c*.

Further, the position of the middle joint point 215c which is the joint point of the middle contact portion 174 of the third tunnel reinforcement 17 and the flange portion 215 of the first seat-attaching bracket 21 is located at the higher level than the position of the front-side joint point 215a which is the joint point of the front-side contact portion 173 and the flange portion 215 and the position of the rear-side joint point 215b which is the joint point of the rear-side contact portion 175 and the flange portion 215. Thereby, a roughly-triangular imaginary plane which is made by connecting the front-side joint point 215a, the rear-side joint point 215b, and the middle contact point 215c can be formed.

Accordingly, when the side-collision load is transmitted from the first seat-attaching bracket 21 to the third tunnel reinforcement 17, for example, the side-collision load can be transmitted via the roughly-triangular imaginary plane.

Thereby, deformation of the flange portion 215 which may be caused by the side-collision load can be suppressed more properly, compared to a case where the third tunnel reinforcement 17 and the flange portion 215 of the first seat-attaching bracket 2 are joined at two joint points.

Thus, the low vehicle-body structure of the automotive vehicle 1 according to the embodiment can improve the rigidity of the load transmission path where the side-collision load is transmitted, suppressing the increase of the number of parts, by joining the middle contact portion 174 and the flange portion 215 at the higher level than the joint point of the front-side contact portion 173 and the flange portion 215 and the joint point of the rear-side contact portion 175 and the flange portion 215.

Moreover, the flange portion 215 of the first seat-attaching bracket 21 comprises the portion 215A which is joined to the front-side contact portion 173, the portion 215C which is joined to the middle contact portion 174, and the portion 215B which is joined to the rear-side contact portion 175, which are formed integrally. Thereby, the rigidity of the flange portion 215 of the first seat-attaching bracket 1 can be improved and the connection strength of the first seat-attaching bracket 21 and the floor tunnel 6 can be further improved.

Further, the lower vehicle-body structure of the automotive vehicle 1 can be configured such that the upper wall portion 214 of the first seat-attaching bracket 21 is supported by the portion 215A joined to the front-side contact portion 173, the portion 215C joined to the middle contact portion 174, and the portion 215B joined to the rear-side contact portion 175.

Accordingly, in a state where the first seat-attaching bracket 21 is joined to the floor tunnel 6, the flange portion 215 can support the upper wall portion 214 more securely, compared to a case where the upper wall portion 214 is supported only by the portion joined to the middle contact portion 174. Thereby, the rigidity of the first seat-attaching bracket 21 can be improved, so that the deformation of the upper wall portion 21 which may be caused by the vehicle-body vibration during the vehicle traveling can be suppressed.

Thus, the low vehicle-body structure of the automotive vehicle 1 can more securely improve the rigidity of the load transmission path where the side-collision load is transmitted by the flange portion 215 which comprises the portion 215A joined to the front-side contact portion 173, the portion 215C joined to the middle contact portion 174, and the portion 215B joined to the rear-side contact portion 175, which are formed integrally.

In correspondence between the present invention and the above-described embodiment, the seat of the present invention corresponds to the front seat FS of the embodiment. Likewise, the seat-attaching bracket corresponds to the first seat-attaching bracket 21, the flange portion of the seat-attaching bracket corresponds to the flange portion 215 of the first seat-attaching bracket 21, the upper wall portion of the seat-attaching bracket corresponds to the upper wall portion 214 of the first seat-attaching bracket 21, the seat attachment portion corresponds to the attachment portion 214a, the connection portion corresponds to the slant portion 214b, the joint point of the middle contact portion of the tunnel reinforcement and the flange portion of the seat-attaching bracket corresponds to the middle joint point 215c, the joint point of the front-side contact portion and the flange portion corresponds to the front-side joint point 215a, the joint point of the rear-side contact portion and the flange portion corresponds to the rear-side joint point 215b, the portion joined to the front-side contact portion corresponds to the portion 215A extending forward from the inward-side edge portion, in the vehicle width direction, of the front wall portion 211, the portion joined to the middle contact portion corresponds to the portion 215C extending upward from the inward-side edge portion, in the vehicle width direction, of the upper wall portion 214, and the portion joined to the rear-side contact portion corresponds to the portion 215B extending rearward from the inward-side edge portion, in the vehicle width direction, of the rear wall portion 212. However, the present invention is not limited to the above-described embodiment but includes any other embodiments.

For example, while the above-described embodiment adopts the first seat-attaching bracket 21 to which the rear end of the seat rail SR is attached, a seat-attaching bracket to which the front end of the seat rail SR is attached or another seat-attaching bracket to which the front seat FS is directly attached, not via the seat rail SR, may be applied.

Further, while the first seat-attaching bracket 21 is the one to which the seat rail SR of the front seat FS is attached, a middle seat or a rear seat may be attached to this first seat-attaching bracket.

While the second cross member 10 is provided between the floor panel 7 and the first seat-attaching bracket 21, the first seat-attaching bracket 21 may be directly joined to the floor panel 7. While the second cross member 10 is configured such that the shape of its vertical section along the vehicle longitudinal direction is of the roughly M shape, a hat-shaped section may be applied for the second cross member 10.

Further, while the flange portion 215 of the first seat-attaching bracket 21 comprises the portion 215A extending forward from the front wall portion 211, the portion 215B extending rearward from the rear wall portion 212, and the portion 215C extending upward from the upper wall portion 214 which are formed integrally, respective portions extending from the front wall portion 211, the rear wall portion 212, and the upper wall portion 214 may be formed separately from each other, not integrally.

Also, while the middle joint point 215c which is located at the higher level than the front-side joint point 215a and the rear-side joint point 215b is provided between the front-side joint point 215a and the rear-side joint point 215b, this joint point 215c may not be necessarily provided between the front-side joint point 215a and the rear-side joint point 215b as long as it is positioned at the higher level than the front-side joint point 215a and the rear-side joint point 215b.

Moreover, while the bead 214*d* extending from the slant portion 214*b* toward the flange portion 215 is provided at the stepped-down portion 214*c* of the first seat-attaching bracket 21, a bead which is configured in a roughly triangular shape, in the side view, such that it has a ridgeline which slants from the upper end of the slant portion 214*b* toward the inward-side edge portion of the stepped-down portion 214*c* may be applied.

Figure 11:
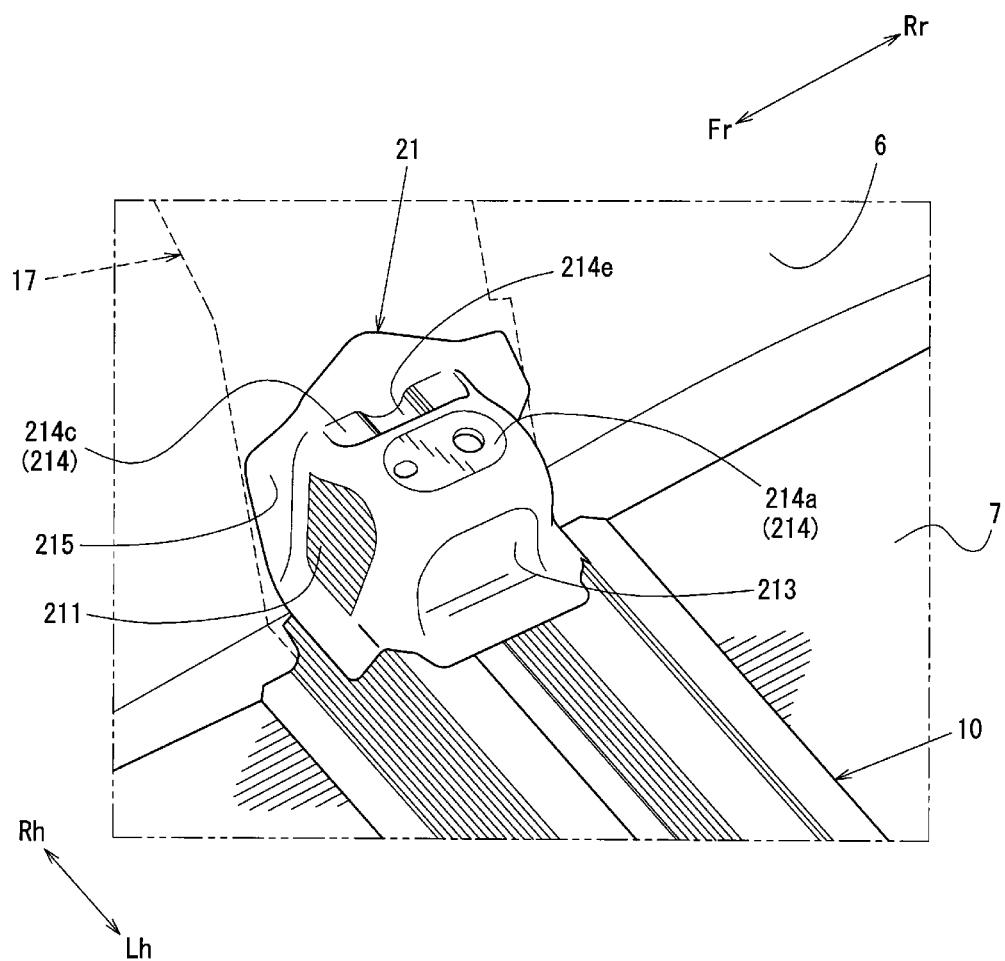
FIG. 11 is a perspective view showing an external appearance of a modified first seat-attaching bracket.

Further, while the bead 214*d* of the first seat-attaching bracket 21 is configured to protrude upward, a bead 214*e* which is configured to protrude downward may be applied alternatively as shown in FIG. 11 which shows an external appearance of a modified first seat-attaching bracket 21.

Thereby, since the lower vehicle-body structure of the automotive vehicle 1 can provide a larger surface area of the flange portion 215 of the first seat-attaching bracket 21, compared to a case where the bead protruding upward is provided at the stepped-down portion 214*c*, the rigidity of the flange portion 215 can be improved.

Thus, the low vehicle-body structure of the automotive vehicle 1 can more securely improve the rigidity of the load transmission path where the side-collision load is transmitted, suppressing the increase of the number of parts, by configuring the bead 214*e* provided at the first seat-attaching bracket 21 to protrude downward.

What is claimed is:

1. A lower vehicle-body structure of an automotive vehicle comprising:
   a floor tunnel extending in a vehicle longitudinal direction;
   a floor panel provided at a lower portion of the vehicle on both outward sides, in a vehicle width direction, of the floor tunnel;
   a tunnel reinforcement provided at a lower-face side of the floor tunnel; and
   a seat-attaching bracket connecting the floor tunnel and the floor panel and supporting a seat where a passenger is seated,
   wherein said tunnel reinforcement comprises a front-side contact portion, a middle contact portion, and a rear-side contact portion which respectively contact said floor tunnel, and a first protrusion portion and a second protrusion portion which respectively protrude in a direction leaving from a lower face of the floor tunnel, the front-side contact portion, the first protrusion portion, the middle contact portion, the second protrusion portion, and the rear-side contact portion being positioned in order from a vehicle forward side and formed integrally,
   said seat-attaching bracket comprises a flange portion which contacts said floor tunnel, the flange portion being connected to the front-side contact portion, the middle contact portion, and the rear-side contact portion of said tunnel reinforcement through the floor tunnel,
   said seat-attaching bracket comprises an upper wall portion where a bead is provided, the bead being configured to extend in the vehicle width direction substantially at the same position, in the vehicle longitudinal direction, as the middle contact portion of said tunnel reinforcement,
   the upper wall portion of said seat-attaching bracket comprises a seat-attachment portion which is positioned at an outward side, in the vehicle width direction, thereof and to which the seat is attached, a stepped-down portion which is positioned at a portion thereof which is located on an inward side, in the vehicle width direction, of said seat-attachment portion and extends toward said floor tunnel, and a connection portion which is connected to an inward-side end, in the vehicle width direction, of said seat-attachment portion at an upper end thereof, extends downward from said upper end, and is connected to an outward-side end, in the vehicle width direction, of said stepped-down portion at a lower end thereof, and
   said bead is provided at said stepped-down portion of the upper wall portion of the seat-attaching bracket and configured to protrude upward and extend from said connection portion of the upper wall portion of the seat-attaching bracket toward said flange portion of the seat-attaching bracket.

2. The lower vehicle-body structure of the automotive vehicle of claim 1, wherein said bead provided at the seat-attaching bracket is configured to protrude downward.

3. The lower vehicle-body structure of the automotive vehicle of claim 1, wherein a joint point of said middle contact portion of the tunnel reinforcement and said flange portion of the seat-attaching bracket is located at a higher level than a joint point of said front-side contact portion and said flange portion and a joint point of said rear-side contact portion and said flange portion.

4. The lower vehicle-body structure of the automotive vehicle of claim 1, wherein the flange portion of said seat-attaching bracket comprises a portion which is joined to the front-side contact portion of said tunnel reinforcement, a portion which is joined to the middle contact portion of said tunnel reinforcement, and a portion which is joined to the rear-side contact portion of said tunnel reinforcement, which are formed integrally.

* * * * *